June 19, 1928.  
F. M. GRAHAM  
COOLING CABINET  
Filed Sept. 15, 1926

1,674,107

Witness  
L. F. Lundberg

Inventor  
Frank M. Graham  
by Bair & Freeman Attorneys

Patented June 19, 1928.

1,674,107

UNITED STATES PATENT OFFICE.

FRANK M. GRAHAM, OF OTTUMWA, IOWA.

COOLING CABINET.

Application filed September 15, 1926. Serial No. 135,555.

My invention relates to cooling cabinets.

It is my purpose to provide a cooling cabinet of very simple and consequently inexpensive construction.

More particularly, it is my object to provide such a cooling cabinet having a casing or cabinet member of the usual type provided with insulated walls with an interior cooling compartment containing a storage member preferably removable, provided with tubular passages up and down its walls for insuring constant circulation and cooling of the air in the storage compartment for thereby maintaining the temperature in the upper part of the storage compartment as nearly as possible the same as in the lower part.

With these and other objects in view, my invention consists in the construction, arrangement and combination of the various parts of my cooling cabinet, whereby the objects contemplated are attained, as hereinafter more fully set forth, pointed out in my claims, and illustrated in the accompanying drawings, in which:

Figure 1:
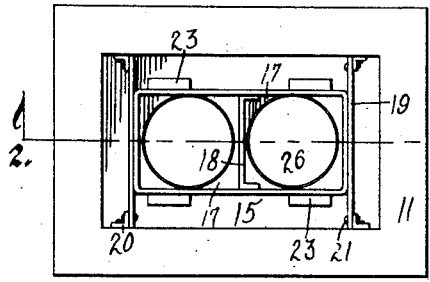
Figure 1 shows a top or plan view of a cooling cabinet embodying my invention.
Figure 2:
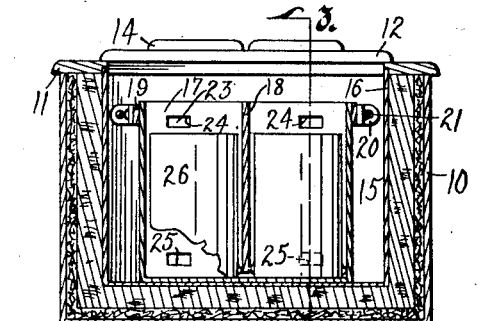
Figure 2 is a detail, sectional view taken on the line 2—2 of Figure 1.

In the accompanying drawings, I have used the reference numeral 10 to indicate generally a cabinet or casing having its walls and bottom preferably of suitable heat insulating construction. The details of this construction do not form part of my present invention.

The cabinet 10 has a fixed cover member 11 and a removable heat insulated cover member 12 formed with one or more suitable openings 13. For the openings 13 I provide the smaller, removable covers 14.

The interior of the cabinet 10 is provided with a rust-proof or other leak proof lining 16, at its bottom and sides thereby forming a refrigerant compartment 15 between the lining 16 and the walls of the storage compartment 17. The cooling compartment 15 may be cooled in any suitable way.

For the purpose of illustrating my invention, I have shown a device of the type adapted to use ice and brine.

Received in the cooling compartment 15 and preferably spaced from the side walls thereof, I place a storage compartment or member 17, which may be divided by a partition 18 into two or more sections or parts. The storage compartment 17 is preferably made in the form of a can or container of rust-proof metal. It may be provided with cross bars or arms 19, which serve to space the storage compartment 17 from the side walls of the cabinet 10.

The lining 16 may be provided with lugs or projecting ears 20, which may be secured to the spaced arms 19 by means of pins 21 or any suitable devices for thus preventing floating or accidental movement of the storage compartment toward the ends of the cabinet 10.

The cooling compartment 15 around the storage compartment 17 may be filled to a proper height with ice and brine 22.

The walls of the storage compartment 17 are provided with a suitable number of vertical, tubular flue members 23, the total capacity of which is much smaller than the air capacity of the storage compartment.

The tubular flue members 23 are closed at their upper and lower ends except for the provision of vents 24 and 25 by which communication is afforded between the upper ends of the flue members 23 and the upper portion of the storage compartment and the lower ends of the flue members 23 and the lower part of the storage compartment. The flue members 23 could terminate above the top of the storage compartment 17 and be open at their tops whereby air could be drawn from a higher elevation for extending the air circulation nearer the top of the cabinet.

I have shown in Figure 1, ice cream cans 26 received in the sections or parts of the storage compartments.

I will now explain the advantages of a structure such as is herein described with reference to the keeping of ice cream.

In the storage of ice cream, the ideal conditions for proper holding qualities require not only that a uniformly low temperature should be afforded, but also that the temperature should be uniform throughout the height or depth of the storage compartment. This involves a somewhat important problem for the reason that it is almost the universal custom to pack ice cream in relatively tall cans. As result of this practice, there arises the problem of keeping the ice cream equally cold at the upper part and lower part of its volume. On account of the tendency of the warmer air to remain in the top of any container, it is found that frequently the upper part of the body of ice cream is soft, even though that near the bottom is well frozen and hard.

Where a temperature is maintained near the bottom of the container low enough to keep the upper part of the ice cream well frozen, the lower part of the ice cream is likely to be frozen too hard.

It is therefore desirable that a circulation of air should be maintained, such as will result in maintaining a uniform temperature throughout the height of the container, in which the ice cream is kept.

With my device, I find that such uniformity of temperature can be more nearly approximated by providing the vertical flue members 23 through which air from the storage compartment for ice cream or the like may circulate.

Figure 3:
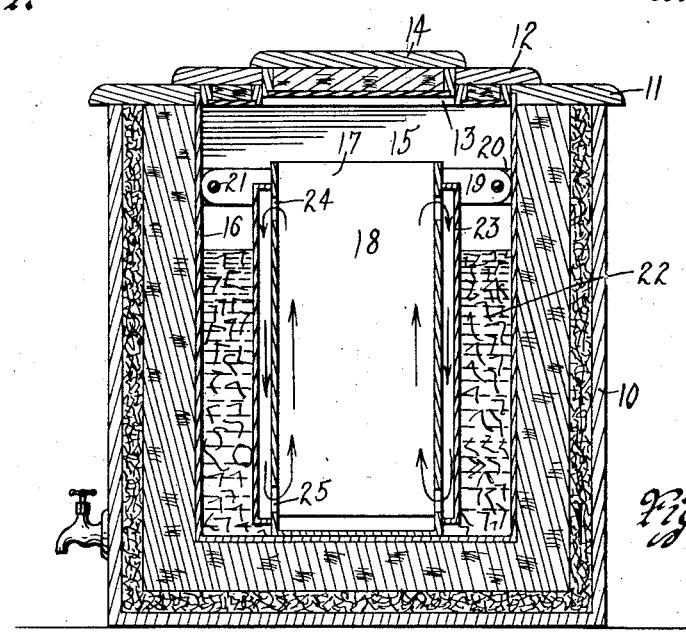
Figure 3 is a sectional view taken on the line 3—3 of Figure 2.
Figure 4:
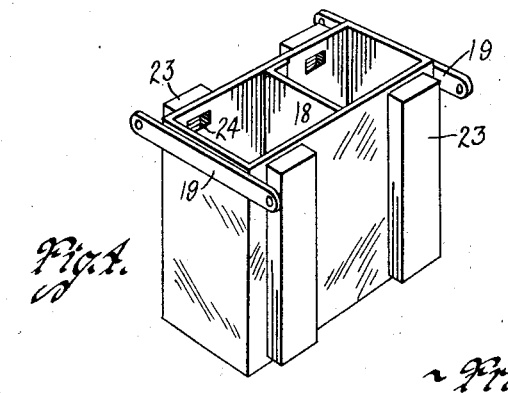
Figure 4 is a perspective view of the removable storage compartment which in the embodiment of the invention here shown is divided by a partition into two portions or sections.

The air in the top of the storage compartment being somewhat higher in temperature than that in the bottom will pass into the flue members 23, as indicated by the arrows in Figure 3, thence downwardly through the flue members, and thence through the vents 25 into the storage compartment.

With these conducting flue members 23 extending down through the refrigerant, the small amount of air admitted to them will be cooled to a lower temperature than the greater amount of air in the storage compartment will be cooled by the side walls thereof. The air in the flue members 23 becomes colder and heavier and settles through the openings 25 thereby drawing the warmer and lighter air through the openings 24.

The intake of these conducting passages is preferably at a level slightly higher than the top of the ordinary ice cream cans.

There will thus be created a continuous circulation of air below the level of the intakes downwardly through the flue members 23 and upwardly through the storage compartment as high as the inlets 24.

There are a number of other advantages inherent in the present structure. It is extremely simple and the circulating flue members are formed integral with the storage compartment, so as to be removable therewith. The circulation is largely confined to the storage compartment, which is desirable.

The circulation is somewhat drier than is the case where there is circulation through an ice compartment, and in the storage of certain foods and products, this is a substantial advantage.

As here shown, the flue members are subjected on three sides to immediate contact with the brine, so as to get the largest benefit of radiation.

It will be obvious that some modifications might be made in the construction and arrangement of the parts of my improved cooling cabinet without departing from the real spirit and purpose of my invention.

I claim:

1. In a cooling cabinet, an outer cabinet member having in its interior a cooling compartment and an interior storage compartment spaced from the walls of the cooling compartment and having walls provided with substantially vertical flue members for the circulation of air, said flue members each comprising three side members secured to a wall of the storage compartment whereby the storage compartment forms a fourth wall, said flue members communicating at their upper and lower ends respectively with the upper and lower parts of the storage compartment.

2. In a cooling cabinet, an outer cabinet member having its interior a cooling compartment and an interior storage compartment spaced from the walls of the cooling compartment and having walls provided with substantially vertical flue members for the circulation of air, said flue members being closed at their upper and lower ends, except that the storage compartment is provided with openings communicating with said flue members near the top and bottom respectively of such walls.

3. In a cooling cabinet, an outer cabinet member having in its interior a refrigerant compartment containing a refrigerant and an interior storage compartment having walls provided with substantially vertical outside flue members extending through said refrigerant and communicating with the interior of the storage compartment at their upper and lower ends whereby air may be cooled in said flue members and circulate therethrough and through said storage compartment.

FRANK M. GRAHAM.